(12) United States Patent
Patel et al.

(10) Patent No.: US 12,300,109 B1
(45) Date of Patent: May 13, 2025

(54) FRONTLINE COLLABORATION SYSTEM FOR AUTOMATICALLY POSTING A NOTICE TO A CONVERSATION THREAD

(71) Applicant: AMERICAN AIRLINES, INC., Fort Worth, TX (US)

(72) Inventors: Krunalkumar G. Patel, Flower Mound, TX (US); Sunil K. John, Carrollton, TX (US); Shalini Neelankavil, Lewisville, TX (US); Chaitanya Kommidi, Plano, TX (US); Christopher Clair, Dallas, TX (US)

(73) Assignee: American Airlines, Inc., Fort Worth, TX (US)

( * ) Notice: Subject to any disclaimer, the term of this patent is extended or adjusted under 35 U.S.C. 154(b) by 353 days.

(21) Appl. No.: 17/590,378

(22) Filed: Feb. 1, 2022

(51) Int. Cl.
| | |
|---|---|
| *G08G 5/00* | (2006.01) |
| *G06N 20/00* | (2019.01) |
| *G08G 5/22* | (2025.01) |
| *H04L 51/216* | (2022.01) |
| *H04L 51/224* | (2022.01) |

(52) U.S. Cl.
CPC .............. *G08G 5/22* (2025.01); *G06N 20/00* (2019.01); *H04L 51/216* (2022.05); *H04L 51/224* (2022.05)

(58) Field of Classification Search
None
See application file for complete search history.

(56) References Cited

U.S. PATENT DOCUMENTS

| | | | | |
|---|---|---|---|---|
| 9,488,487 | B2* | 11/2016 | Andersen | G06Q 10/10 |
| 10,516,636 | B2* | 12/2019 | Brown | H04L 51/58 |
| 10,616,354 | B2* | 4/2020 | Kumar | G06Q 20/047 |
| 2015/0348422 | A1* | 12/2015 | Agrawal | G08G 5/06 |
| | | | | 701/120 |
| 2016/0003637 | A1* | 1/2016 | Andersen | G01C 21/362 |
| | | | | 701/519 |
| 2018/0341928 | A1* | 11/2018 | Khan | H04L 51/04 |
| 2019/0020725 | A1* | 1/2019 | Kumar | H04L 41/40 |
| 2019/0361896 | A1* | 11/2019 | Brunets | G06F 16/9024 |
| 2019/0361910 | A1* | 11/2019 | Rogynskyy | G06F 16/9535 |
| 2019/0361911 | A1* | 11/2019 | Rogynskyy | H04L 43/067 |
| 2021/0326940 | A1* | 10/2021 | Serna | G06Q 30/016 |

(Continued)

*Primary Examiner* — Farhan M Syed
(74) *Attorney, Agent, or Firm* — HAYNES AND BOONE, LLP

(57) ABSTRACT

A method that includes generating, using a communication application, a conversation thread so that the conversation thread is displayed on a user interface to members of the conversation thread, with the conversation being associated with an event that has an expected event timeline and the members being associated with the event. The method includes posting, using the communication application, a member post and an automated post to the conversation thread, performing sentiment analysis, using a machine learning model, of the member post; identifying, based on the sentiment analysis and the automated post, a predicted delay to the expected event timeline; sending, to the communication application and from the machine learning model, a predicted delay notice; receiving, by the communication application, the predicted delay notice; and automatically posting, using the communication application and in response to the receipt of the predicted delay notice, the predicted delay notice to the conversation thread.

22 Claims, 10 Drawing Sheets

(56) References Cited

U.S. PATENT DOCUMENTS

2022/0029940 A1\* 1/2022 Wang .................. G06F 16/2379
2022/0255889 A1\* 8/2022 Deole ................... H04L 51/046
2023/0128243 A1\* 4/2023 Sundareson ....... H04N 21/4781

\* cited by examiner

FIG. 3

- Chat
- Teams
- Activity
- ConnectMe...
- Files
- Calendar
- Slack
- Shifts
- Calls
- Rovr
- Who
- App
- Help

MQ35 — 315

Pinned
Your teams
  MC  MQ35 63 026
       DFW-PNS B1A 13:12
General
Hidden teams MC General Posts Files Wiki DOD ParticipantList + — 305 — Org | Meet

Davis, Joyce 11:57 AM — 310a
load agent joyce 5-6703
↵ Reply

Davis, Joyce 11:58 AM — 310b
author 76pax w/1560 cargo fuel amt 12.4 mel/none
↵ Reply

ConnectMe 12:06 PM — 310c
Extended Delay: MQ3563
DFW - PNS    Tail: 026         Gate: B1A
SKD: 13:05
ETD: 13:12
Reason code: LEC
Remarks: -

Davis, Joyce 12:48 PM — 310d
catering off
↵ Reply

Haddock, Carmen 12:53 PM
Last pax off 12:33, last crew off 12:37 Catering on 12:38 catering off 12:46 Sec Done 12:50
↵ Reply — 310e New conversation

300

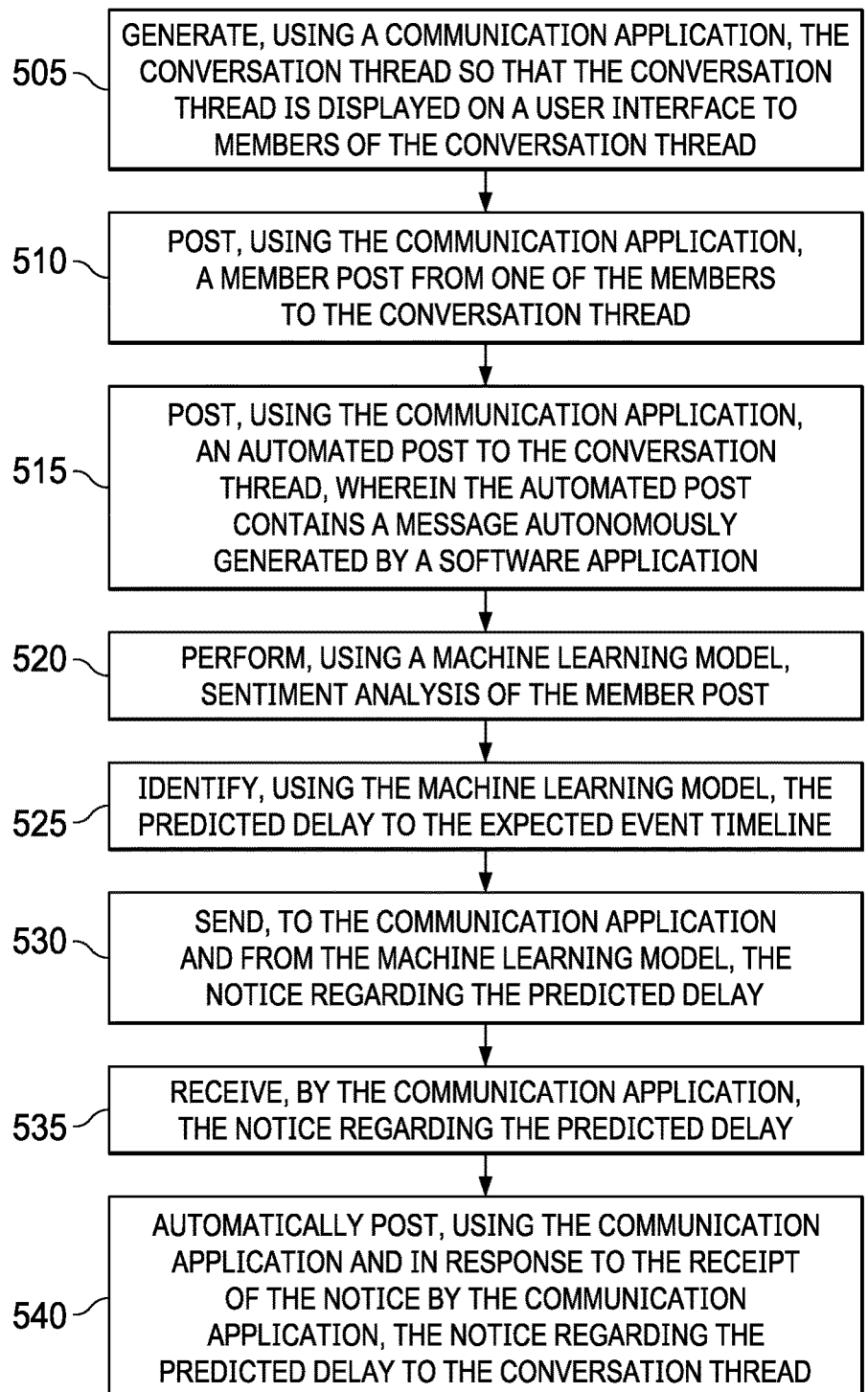

FRONTLINE COLLABORATION SYSTEM FOR AUTOMATICALLY POSTING A NOTICE TO A CONVERSATION THREAD

TECHNICAL FIELD

This disclosure relates in general to a communication application and specifically to a communication application that automatically posts a notice regarding a predicted delay to a conversation thread after performing sentiment analysis on posts in the conversation thread.

BACKGROUND

Conventional communication applications post messages to a conversation thread for viewing by the members of that conversation thread. Generally, the conversation thread is created by human users and are useful in sharing messages and information among the members. Conventionally, the communication application itself does not monitor the content of the posts or analyze the content of the messages posted to the conversation thread. As such, the messages and information shared among members is not automatically used to create "input" for another system or application. While a member may use the information shared with him or her, generally the member herself or himself would need to update another application to include the shared information. As this update requires the member to access and update the other application, human error is possible in regard to updating information and time is lost in the updating process. Moreover, the analysis of the information by the human user may be incorrect or incomplete, resulting in incorrect updates being used as an input to the other application.

Some communication applications allow for a computer-generated message from a separate application to be posted to the conversation thread. However, the transfer of data from a separate application to the communication application is difficult because the data must be transformed such that the format is readable or accessible by the communication application.

BRIEF DESCRIPTION OF THE DRAWINGS

FIG. 3 is an illustration of a window displayed on a UI of a computer, according to an example embodiment.

FIGS. 5A and 5B together form a flow chart illustration of a method of operating the system of FIGS. 1-4, according to an example embodiment.

DETAILED DESCRIPTION

Figure 1:
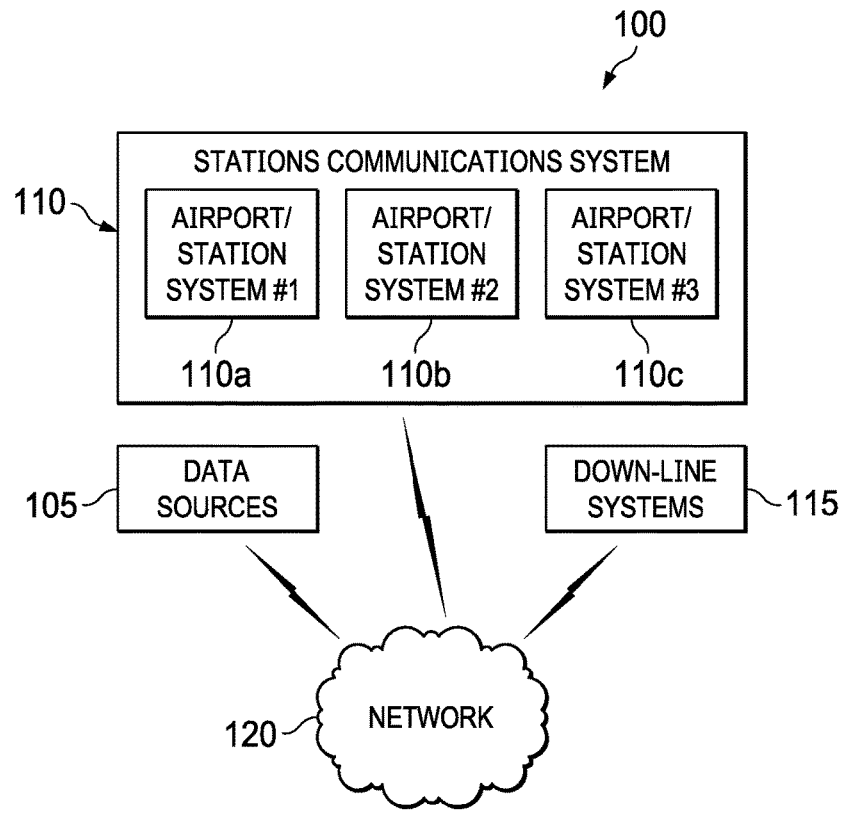
FIG. 1 is a diagrammatic illustration of system that includes data sources, down-line systems, and a stations communication system that includes a first, second, and third airport/station system, all of which are connected via a network, according to an example embodiment

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As noted above, conventional communication applications post messages to a conversation thread for viewing by the members of that conversation thread. Generally, the conversation thread is created by human users and are useful in sharing messages and information among the members. Conventionally, the communication application itself does not monitor the content of the posts or analyze the content of the messages posted to the conversation thread. As such, the messages and information shared among members is not automatically used to create "input" for another system or application. While a member may use the information shared with him or her, generally the member herself or himself would need to update another application to include the shared information. As this update requires the member to access and update the other application, human error is possible in regard to updating information and time is lost in the updating process. Moreover, the analysis of the information by the human user may be incorrect or incomplete, resulting in incorrect updates being used as an input to the other application.

Some communication applications allow for a computer-generated message from a separate application to be posted to the conversation thread. However, the transfer of data from a separate application to the communication application is difficult because the data must be transformed such that the format is readable or accessible by the communication application.

Problems associated with conventional systems include the inability to identify sentiment of human messages posted to a conversation thread combined with the inability to automatically update other applications with the identified sentiment. The automatic update of other applications is an improvement to the technical field of communication applications and also improves the function of the computer from which the users are viewing the messages. That is, additional processing power and memory will be required of the computer that the user uses to enter the inputs to the other application when compared to the power and memory requirements of merely the user posting his or her message to the conversation thread.

Other problems associated with conventional systems include the inability or difficulty of posting computer-generated posts to the conversation thread. The inability or difficultly of posting these posts to the conversation thread is based on format differences between the outputs of external applications that provide the message posts and inputs of the conventional communication applications. A first format, which is associated with a first system output, may be incompatible with the second format, which is associated with inputs to the conventional communication application. As such, a technology-based problem is associated with the automatic transfer of updates or data from external systems to the conventional communication applications.

In an example embodiment, as illustrated in FIG. 1, a system is generally referred to by the reference numeral 100 and includes data sources 105, a stations communications system 110, and downline systems 115 connected via a network 120. While not illustrated, any one or more of the data sources 105, the stations communications systems 20, and the downline systems 115 include or are associated with one or more computers. Generally, a computer includes a computer processor and a computer readable medium operably coupled thereto. Instructions accessible to, and executable by, the computer processor are stored on the computer readable medium. A database is also stored in the computer readable medium. The system 100 may also be configured to generate a computer window that is displayed on, or forms a portion of, a user interface ("UI") of a computer. Generally, the system 100 provides an improvement to the technical field relating to communication applications because the system 100 allow for the human messages to be analyzed using sentiment analysis, identifies relevant data based on the sentiment analysis, and then updates other applications with the relevant data. Moreover, the system 100 includes a machine learning model that transforms different data feeds from one system to be compatible with another system to solve the problem of incompatible data transfer between conventional systems/applications.

In some embodiments, the data sources 105 are or include a dispatch environmental control system, an enhanced reservation system that provides data regarding passengers, the Federal Aviation Administration, an off-schedule operation system, a flight operating system, an aircraft communication addressing and reporting system, and the Automated Surface Observation System that provides weather observations. In some embodiments, the data sources 105 include different applications or systems located or at least associated with different entities, etc.

As illustrated, the stations communications system 110 includes a plurality of airport/station systems, such as for example an airport/station system #1 110a, an airport/station system #2 110b, and an airport/station system #3 110c. In some embodiments, the airport/station #1 110a is associated with one airport, such as DFW or Dallas/Fort Worth airport, while airport/station system #2 110b is associated with a different airport, such as ORD or O'Hare International Airport.

In some embodiments, the down-line systems 115 includes any application, system, or entity that is dependent upon data generated or identified in the stations communications system 110 or involves a process that is downstream from an event that is monitored by the stations communication system 110. In some embodiments, and when one or more of the data sources 105 store information regarding down-line systems 115, the down-line systems 115 includes any one or more of the data sources 105.

In an example embodiment, the network 120 includes the Internet, one or more local area networks, one or more wide area networks, one or more cellular networks, one or more wireless networks, one or more voice networks, one or more data networks, one or more communication systems, and/or any combination thereof. In some embodiments, the network 120 also includes WIFI, Bluetooth, and Long-Term Evolution ("LTE") or other wireless broadband communication technology.

Figure 2:
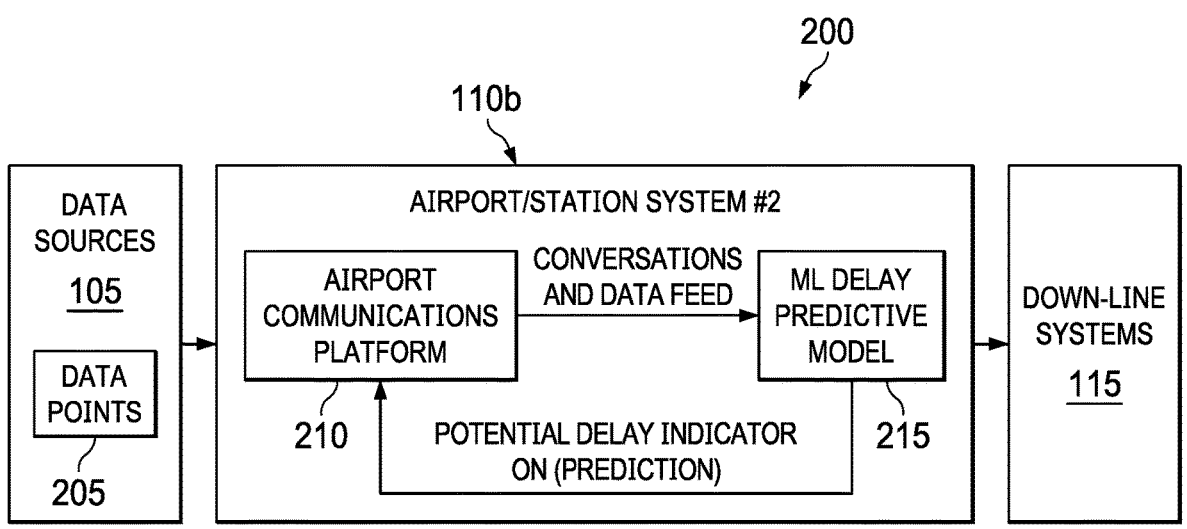
FIG. 2 is a data flow diagram that includes the data sources, the second airport/station system, and the down-line systems of FIG. 1, according to an example embodiment.

FIG. 2 is a data flow diagram referenced by the numeral 200 that includes data points 205 that are associated with the data sources 105, the airport/station system #2 110b, and the down-line systems 115. As illustrated, the airport/station system #2 110b includes an airport communications application 210 and a machine learning delay predictive model 215. In some embodiments, the airport communications application 210 receives messages from human users and posts those messages to a conversation thread, group, or channel that is accessible by a plurality of users or team members. In some embodiments, the airport communication application 210 generates the posts that are posted to the conversation thread.

In some embodiments, the posts are posted in a conversation thread that forms a portion of a UI of a computer, as illustrated in FIG. 3. Generally, a post includes sender identification data such as the username of who sent/posted the message, a timestamp, the message body, and a selectable tab or selectable portion that allows the user viewing the UI to respond to the post. As illustrated in FIG. 3, the UI is identified by the numeral 300, the conversation thread is identified by the numeral 305, and posts are identified by the numerals 310a-310f. The UI 300 may also include a listing of conversation threads or "teams" to which the user is a member. As illustrated in FIG. 3, a listing 315 is provided that identifies the team or conversation thread 305 as "MQ3563 026", with "MQ3563" being associated with the flight number and "026" being associated with the tail number. Thus, the identifier is a flight number and tail number. However, other identifiers are available, such as a gate number, terminal number, etc. As illustrated, posts 310a, 310b, 310d, and 310e are posted by humans, but post 310c is associated with a sender "ConnectMe", which is one name of the communication application 210. Generally, the posts in one conversation thread are associated with an event that has an expected event timeline and the members of the conversation thread are associated with the event. For example, and relating to FIG. 3, the event may be an airplane departing on a flight, the expected event timeline is a scheduled departure time of the flight, and the members of the conversation thread are the crew members, support staff, etc. that are involved, support, or report on the flight. The message body of 310d is "catering off" with a timestamp of 12:48 PM. This message body relates to the activity of providing catering to an airplane during a turnaround (i.e., time spent preparing the plane between consecutive flights). The airplane is being prepared to depart on a flight. As such, the status of the catering activities can affect the departure time of the airplane for the flight. Other message bodies may include users or members checking-in to the conversation thread, such as for example the message body of 310a of "load agent joyce 5-6703."

Different types of message bodies may be included and posted to the thread. For example, the post 310c is a computer-generated post or an automated post that contains a message autonomously generated by a software application. The "sender" of the post 310c is identified as "ConnectMe", which is a software application. The timestamp is 12:06 PM. The message of the body includes Extended Delay: MQ3563, DFW-PNS, Tail: 026, Gate B1A, SKD or Scheduled departure time of 13:05, ETD or estimated departure time of 13:12, Reason code: LEC, and Remarks. The post 310c is a message autonomously generated that indicates the flight number MQ3563, having a flight path from Dallas/Fort Worth to Pensacola International Airport on an airplane having tail number 026 from gate B1A had a scheduled departure time of 13:05 but now has an estimated departure time of 13:12. The reason code is LEC, which may indicate a late cargo preparation/documentation. As such, although the sender of the post is identified as "ConnectMe", the message may be autonomously generated by software application that manages or monitors the cargo preparation/documentation. Upon determining that the cargo preparation/documentation was behind schedule, the application monitoring the progress of the cargo preparation/documentation sends the notice to application 210 for posting to the flight affected by the delay.

Turning back to FIG. 2, the conversations managed by the application 210 and data feeds are received or accessed by the ML Delay predictive model 215. Sentiment analysis is performed on the posts in the conversation thread to monitor the status of the event. When the event, such as departure of an airplane on a flight, first requires the completion of a plurality of subevents, monitoring the status of the event includes monitoring the status of the subevents to determine if the readying of the airplane is progressing according to plan/timeline. In some embodiments, the sentiment analysis is performed by the model 215, but in other embodiments another application performs the sentiment analysis and provides an analysis to the model 215. The ML Delay predictive model 215 then generates, based on the received and accessed conversations and data feed, a potential delay indicator or a predicted delay, which is reported to one or more conversation threads of the airport communications application 210. The potential delay indicator may relate predicted delay of the event associated with the conversation thread, a potential or predicted delay of an event associated with a different conversation thread involving an event that is dependent upon or related to the event of the conversation 305, etc. This data flow allows for the sentiment in the conversations to predict a delay of an event or monitor the status of an event.

In some embodiments, the airport communications application 210 creates the UI 300.

In some embodiments, the ML Delay Predictive Model 215 performs sentiment analysis on the conversation threads and data feed. In some embodiments, the model 215 evaluates text within the message body to identify the underlying sentiment, specifically to determine if the sentiment is that the event is on schedule, ahead of schedule, behind schedule, or cancelled. In some embodiments, the model 215 uses the text in the message bodies, the identity of the sender of the message, and the time stamp to identify the status of the event and/or the sentiment of the messages. For example, the model 215 may review the message body of "catering off" of message 310d from Joyce Davis with a time stamp of 12:48 and predict that the expected event timeline (e.g., scheduled departure time of the flight), will occur on schedule because the catering activity is scheduled to be completed at 12:55 and the message 310d indicates that the catering activity is scheduled before the completed scheduled time of 12:55.

Figure 4:
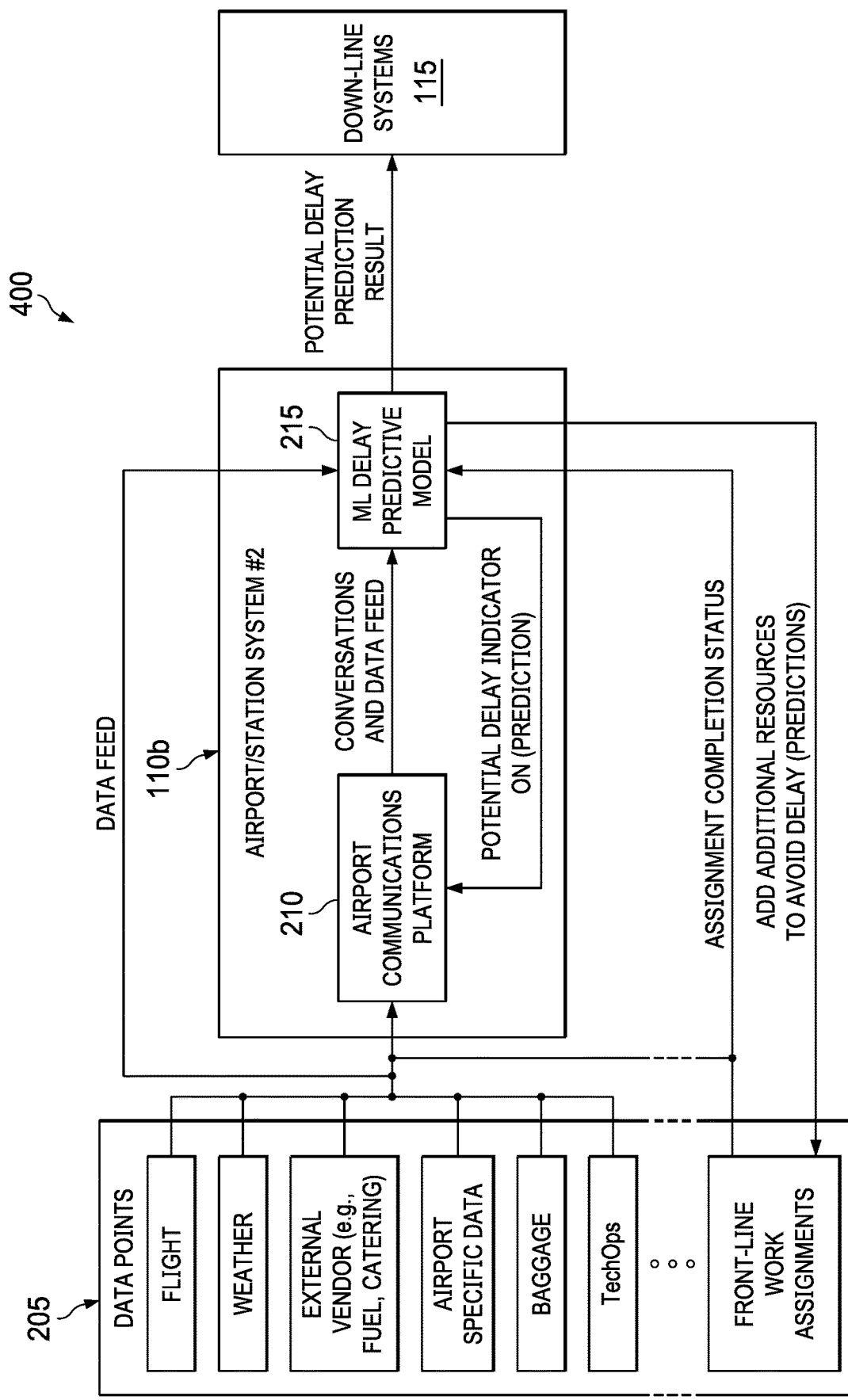
FIG. 4 is another data flow diagram involving data points, the second airport/station system, and the down-line systems of FIG. 1, according to an example embodiment.

FIG. 4 is another data flow diagram 400 involving the data points 205, the second airport/station system #2 110b, and the down-line systems 115. As illustrated, the data points 205 can include data regarding flights, weather, external vendors (e.g., fuel, catering), airport specific data, baggage, tech ops, and front-line work assignments, among other data. Generally, data regarding flights may include any one of more of scheduled arrival time of a flight at the airport or touchdown time, aircraft data for the aircraft associated with the flight, data regarding the passengers aboard the flight, assigned gate, scheduled arrival at the gate, flight duration, data regarding the flight crew working the flight, etc. Data regarding weather may include weather at airport/station #2, weather at other airport/stations, etc. Data regarding external vendors may include a listing of external vendors, a scheduled service provided by an external vendor and for a specific flight or turnaround, a scheduled start time for the service, a scheduled end time for the service, contact information for persons associated with the external vendor, a message or update regarding a vendor service for a specific airplane or airport. Airport specific data may include terminal information associated with the airport, gate information associated with the airport, gate scheduling information, equipment availability within the airport and/or the terminal, service/maintenance capabilities associated or provided by the airport, changes to gate assignments, etc. Data relating to baggage may include baggage location(s), baggage tracking including past locations of baggage, baggage handling equipment, scheduled baggage locations, etc. Data relating to tech ops may include data regarding availability of maintenance services at each airport, scheduled maintenance for each aircraft, airport at which scheduled maintenance will take place, open ticket items associated with each aircraft, if any, etc. Data relating to front-line work assignments may include scheduled work assignments, hours worked by employees, working limitations such as rest requirements, etc.

The data points 205 are accessed or sent to the airport station #2 110b. In some embodiments, the data points 205 are provided to or accessed by the airport communications application 210, specifically to/by the airport communications application 210 and/or the ML delay predictive model 215. The model 215 then uses the conversation and data feed to identify predicted flight delays, in this example. Upon the identification of delays or predicted delays, the model 215 sends or otherwise causes the delay prediction to be displayed in the conversation relating to the relevant flight via the application 210. In addition, the predicted delay is also sent to down-line systems 115 so that down-line or down-stream systems, schedules, etc. can be rearranged or changed to minimize down-line or down-stream disruptions. Moreover, and in response to the identification of the predicted delay, the model 215 can indicate that additional resources are required and/or identify additional resources required. The data regarding the additional resources is then sent or accessed to the front-line work assignment data points. The front-line work assignment data point/source can then act on the recommendation to add additional resources and send data regarding the assignment of work assignments to the model 215 so that the model 215 can account for the additional resources in the predictions.

Figure 5B:
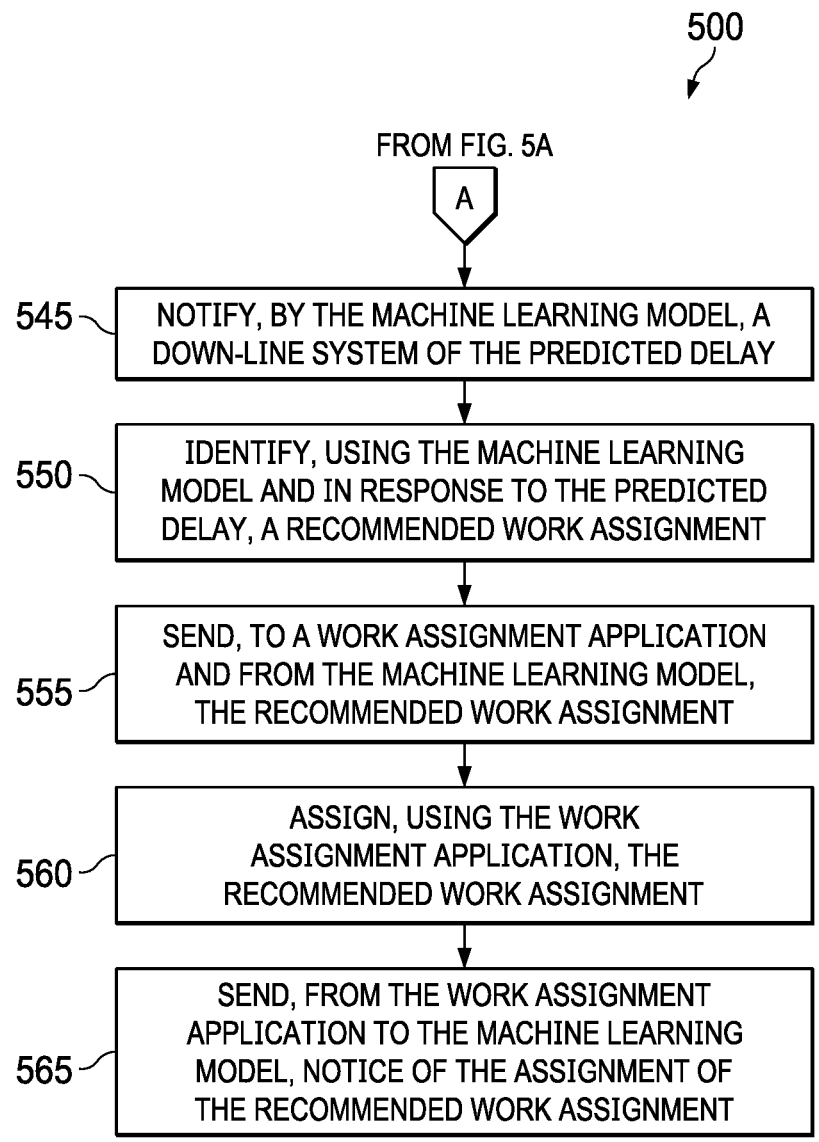

In an example embodiment, as illustrated in FIGS. 5A and 5B with continuing reference to FIGS. 1-4, a method 500 of operating the system 100 includes generating, using the communication application 210, the conversation thread 305 to be displayed on a user interface to members of the conversation thread 305 at step 505; posting, using the communication application 210, a member post from one of the members to the conversation thread 305 at step 510; posting, using the communication application 210, an automated post to the conversation thread 305, wherein the automated post contains a message autonomously generated by a software application at step 515; performing sentiment analysis, using the machine learning model 215, of the member post and of the automated post at step 520; identifying, based on the sentiment analysis and the automated post, the predicted delay to the expected event timeline at step 525; sending, to the communication application 210 and from the machine learning model 215, the notice regarding the predicted delay at step 530; receiving, by the communication application 210, the notice regarding the predicted delay at step 535; automatically posting, using the communication application 210 and in response to the receipt of the notice by the communication application 210, the notice regarding the predicted delay to the conversation thread 305 at step 540; notifying, by the machine learning model 215, a down-line system of the predicted delay at step 545; identifying, using the machine learning model 215 and in response to the predicted delay, a recommended work assignment at step 550; sending, to a work assignment application and from the machine learning model 215, the recommended work assignment at step 555; assigning, using the work assignment application, the recommended work assignment at step 560; and sending, from the work assignment application to the machine learning model 215, notice of the assignment of the recommended work assignment at step 565.

In some embodiments and at step 505, the communication application 210 generates the conversation thread 305 to be displayed on a user interface to members of the conversation thread 305. In some embodiments, a potential delay of a flight is identified after reviewing any one or more of weather data, staffing data, and fueling data. In some embodiments, a flight is at risk for a delay, or has a potential delay, because of a weather event identified via the weather data, because there is a staffing issue (e.g., sick day, tardiness, staff is delayed from upstream flight), and/or because there is a fueling delay among other potential causes. In some embodiments and when the potential delay of a specific flight is identified by the machine learning model 215 or other application, the conversation thread 305 is created for that specific flight. The conversation thread 305 is created by identifying the team members associated with that flight and then auto-enrolling them in the conversation thread 305, thereby dynamically auto-enrolling the members to the conversation thread 305. In some embodiments, identifying members associated with a flight or event includes accessing the front-line work assignments and determining which employees/members are associated or assigned to a flight. In some embodiments, the application 210 creates multiple conversation threads, with each conversation thread having a unique grouping of team members. A team member may be a member of more than one conversation thread, depending on how many events the team member is involved in during a specific period of time.

In some embodiments and at step 510, the communication application 210 posts a member post from one of the members to the conversation thread 305. Posting a post to the conversation thread generally includes visually displaying, in the conversation thread 305, a text box or other graphic that includes human-readable data, such as words and numbers, along with the time stamp, and sender identification data. Before posting a member post, the communication application 210 receives a message from a user or member of the conversation thread 305. The message may be received via a user's keyboard, microphone, or other input device associated with a computer used by the user or member.

In some embodiments and at step 515, the communication application 210 posts an automated post contains a message autonomously generated by a software application. Generally, the posting of the automated posts is similar to the posting of the member post. However, to post an automated post, a message or data from the software application is received by the communication application 210. In some embodiments, the data generated from the software application and sent to the communication application 210 is the message itself. That is, the data generated from the software application is formatted in human-readable text and is similar or identical to the message posted in the post. However, in other embodiments, the data generated by the software application and received by the communication application 210 is in a different format from the format of the message in the post. In other embodiments, the data generated by the software application is received by the system 110b (the communication application 210 and/or the model 215) is used by the system 110b to calculate or identify an event and then the system 110b generates the message to be posted to the conversation thread 305. For example, and regarding the post 310c, the data received by the system 110 may indicate that MQ3563 is delayed by 7 minutes and the system 110b posts the scheduled time of departure is 13:05 and then calculates and posts the estimated time of departure of 13:12, which is based on the 7 minutes being added to the schedule time of departure.

In some embodiments and at step 520, the machine learning model 215 performs sentiment analysis of the member post. In some embodiments, Microsoft® Azure performs sentiment analysis. Generally, sentiment analysis is a natural language processing technique used to detect sentiment and/or subjective information in text. In some embodiments, the sentiment detected includes one or more of a polarity (i.e., positive, negative, neutral), feeling and emotions (e.g., angry, happy, sad), urgency (e.g., urgent or not urgent), intentions (e.g., trying to complete a task, plan on completing a task, dismissing a task, wanting to complete a task), stress and/or anxiety markers (e.g., stress or not stressed), confidence markers (e.g., very confident, somewhat confident, etc.). In some embodiments, the sentiment is aspect-based sentiment analysis so that the aspect or feature mention is identified. For example and based on a message body of "last pax off 12:33" having the time stamp of 12:53, the machine learning model 215 may detect that the last passenger departed the aircraft at 12:33. Thus, although the time stamp is 12:53, the model 215, using sentiment analysis, detects that the last passenger was off the aircraft at 12:33. In some embodiments, the machine learning model 215 also performs sentiment analysis on staff assignment manager communications, flight data and/or flight communications, and other various communications.

In some embodiments and at step 525, the machine learning model 215 identifies, based on the sentiment analysis and the message autonomously generated by a software application, the predicted delay to the expected event timeline. The machine learning model 215 uses the sentiment detected from the human posts and the message autonomously generated by the software application to detect a predicted delay to the expected event timeline. In some embodiments, the machine learning model 215 uses the automated posts posted to the conversation thread, which are based on the message autonomously generated by a software application, and/or the message autonomously generated by a software application when identifying a predicted delay. That is, data provided by the data sources 105 may be used by the machine learning model 215 to identify the predicted delay. In some embodiments, the machine learning model 215 compares the sentiment and other data identified in the posts and/or data provided by the data sources 105 to the expected timeline to determine whether the status of the event is in line or on time compared to the expected timeline. In some embodiments, the machine learning model 215 accesses the expected departure time or other expected event timelines that may be stored in one of the data sources 105 when identifying the predicted delay.

In some embodiments and at step 530, the machine learning model 215 sends, to the communication application 210, the notice regarding the predicted delay. After the predicted delay is identified, the machine learning model 215 sends the notice of the predicted delay to the communication application 210.

In some embodiments and at step 535, the communication application 210 receives the notice regarding the predicted delay.

In some embodiments and at step 540, the communication application 210 automatically posts, in response to the receipt of the notice, the notice regarding the predicted delay to the conversation thread. In some embodiments, the posting of the notice to the conversation thread is similar, or identical, to the posting of an automated message.

In some embodiments and at step 545, the machine learning model 215 notifies a down-line system of the predicted delay. Notifying a down-line system may include pushing an update to another application or data source regarding the predicted delay or rescheduled departure time.

In some embodiments and at step 550, the machine learning model 215 identifies, in response to the predicted delay, a recommended work assignment. In some embodiments, the machine learning model 215 identifies a work assignment that should be updated, replaced, created, or cancelled in response to the predicted delay. For example, if the predicted delay causes an assigned member to exceed their on-duty time if that member crews the delayed flight, then the recommended work assignment may provide notice that the assignment member cannot crew the delayed flight and identify a new crew member, which will not exceed their on-duty time if he or she crews the delayed flight, that should be assigned to the delayed flight.

In some embodiments and at step 555, the machine learning model 215 sends, to a work assignment application, the recommended work assignment. Sending the recommended work assignment may include pushing an update to another application or data source.

In some embodiments and at step 560, the work assignment application assigns the recommended work assignment.

In some embodiments and at step 565, the work assignment application sends, to the machine learning model 215, notice of the assignment of the recommended work assignment.

In some embodiments, Microsoft® Azure processes information for the system 100. In some embodiments, data, such as the data points 205, is sent from the data sources 105 to be processed via Microsoft® Azure or the like to reformat the data from an incompatible format to a compatible format for the stations communication system 110.

Figure 6:
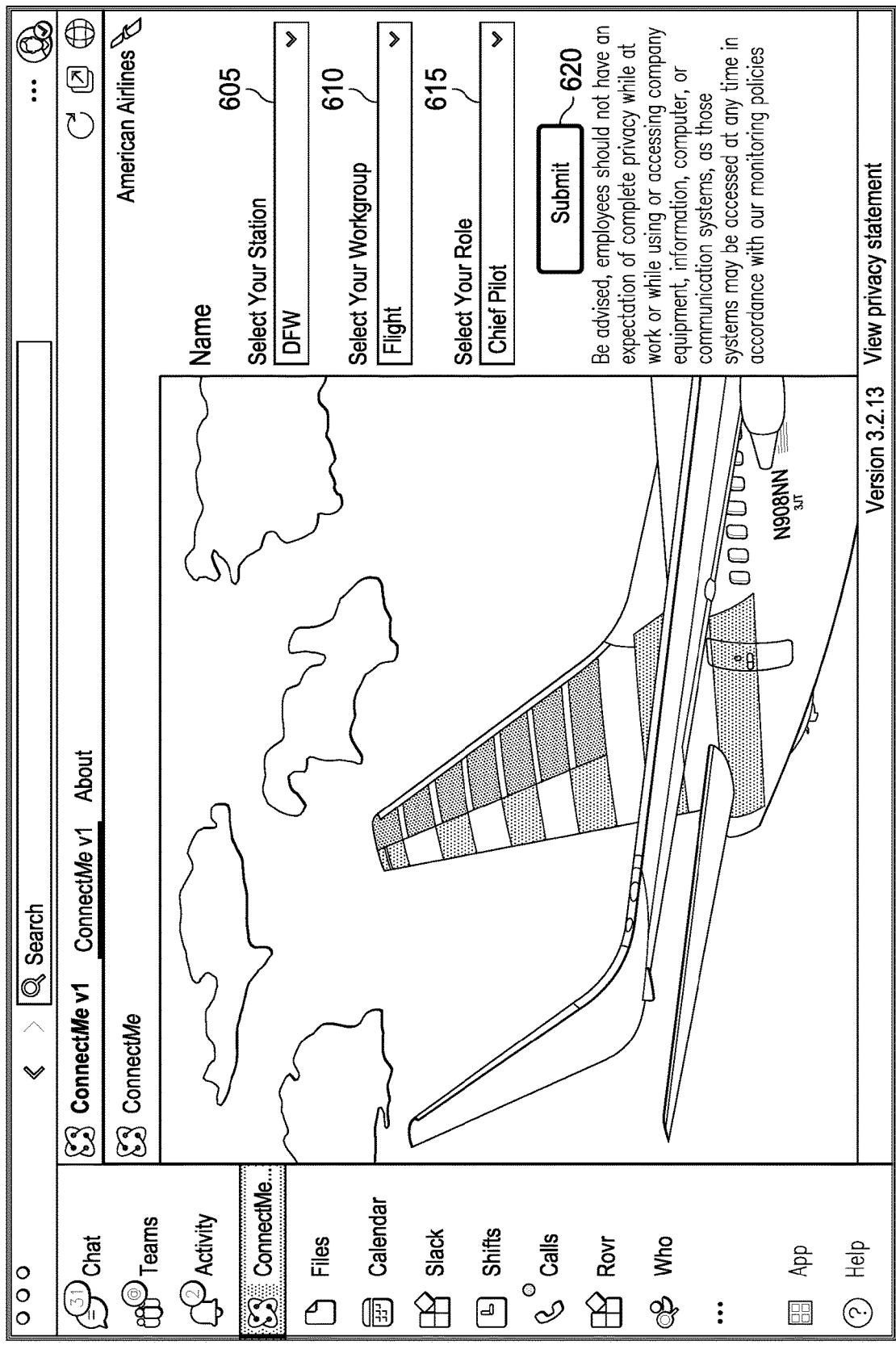
FIG. 6 is an illustration of another window displayed on a UI of a computer, according to an example embodiment.

In some embodiments, the application 210 receives information from users or members regarding their station, workgroup, and role via a UI. An example UI is illustrated in FIG. 6 and is referred to by the numeral 600. The UI 600 includes a team member name and menus 605, 610, and 615 for selecting a station input, workgroup input, and role input. A submit button 620 is also provided to finalize or upload the inputs. In some embodiments, the inputs provided by the team member via the UI 600 auto-enrolls them or automatically includes them in relevant conversations. In some embodiments, a relevant conversation is a conversation about an event that the team member is assigned to or otherwise involved in. For example and when the event is a flight or departure of an airplane, the team members associated with that flight or departure of an airplane can or will be joined in the conversation regarding that flight or departure of that airplane. In some embodiments, the inputs provided by the user via the UI 600 is used by the system 100, in combination with or without data points from the work assignments, to determine which conversations are relevant to each team member.

Figure 7:
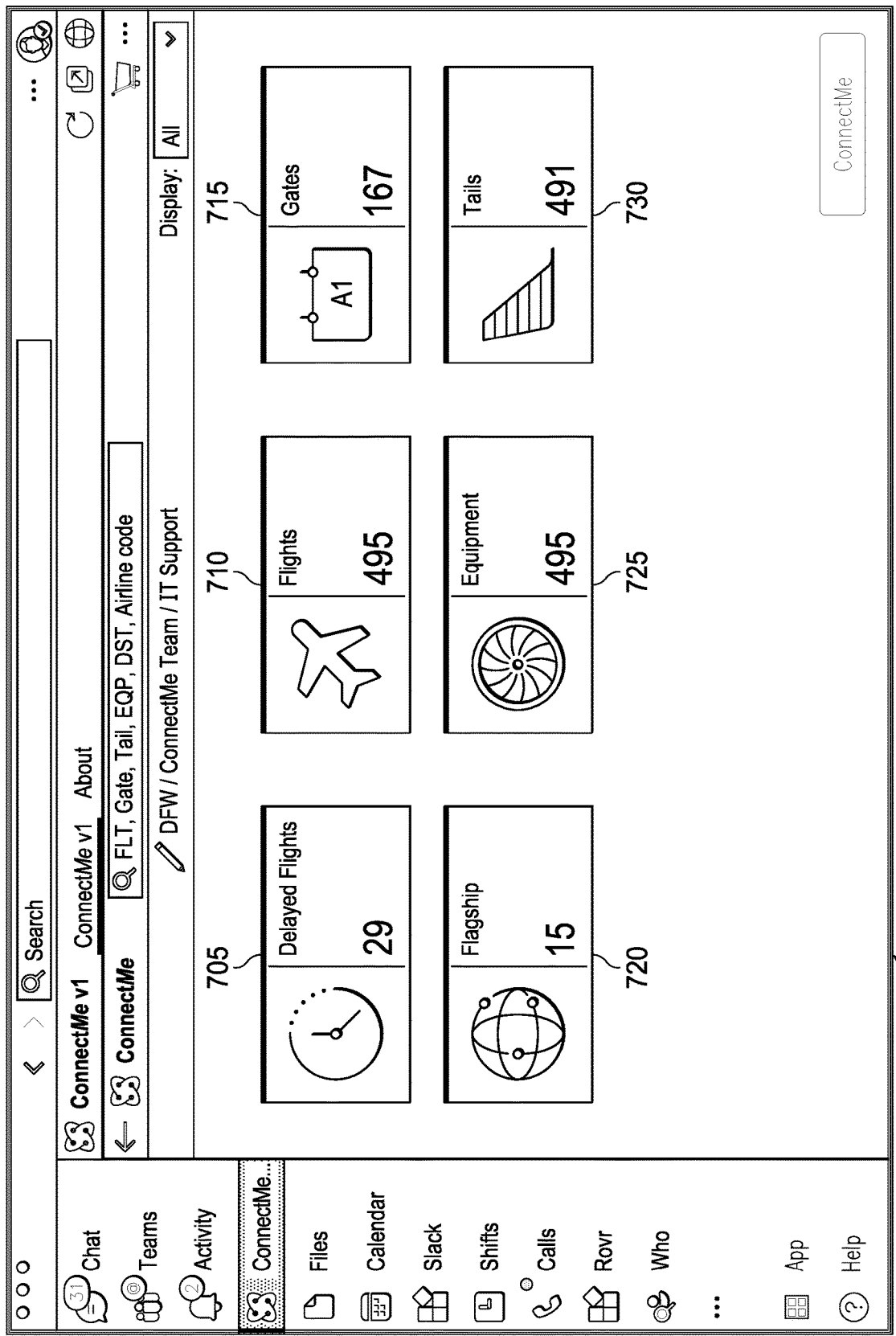
FIG. 7 is an illustration of yet another window displayed on a UI of a computer, according to an example embodiment.

FIG. 7 illustrates a UI 700 including a menu with selectable items of "Delayed Flights" 705, "Flights" 710, "Gates" 715, "Flagship" 720, "Equipment" 725, and "Tails" 730. Each of the items 705, 710, 715, 720, 725, and 730 is selectable to open a listing of delayed flights, flights, gates, flagship, equipment, and tails, respectively.

Figure 8:
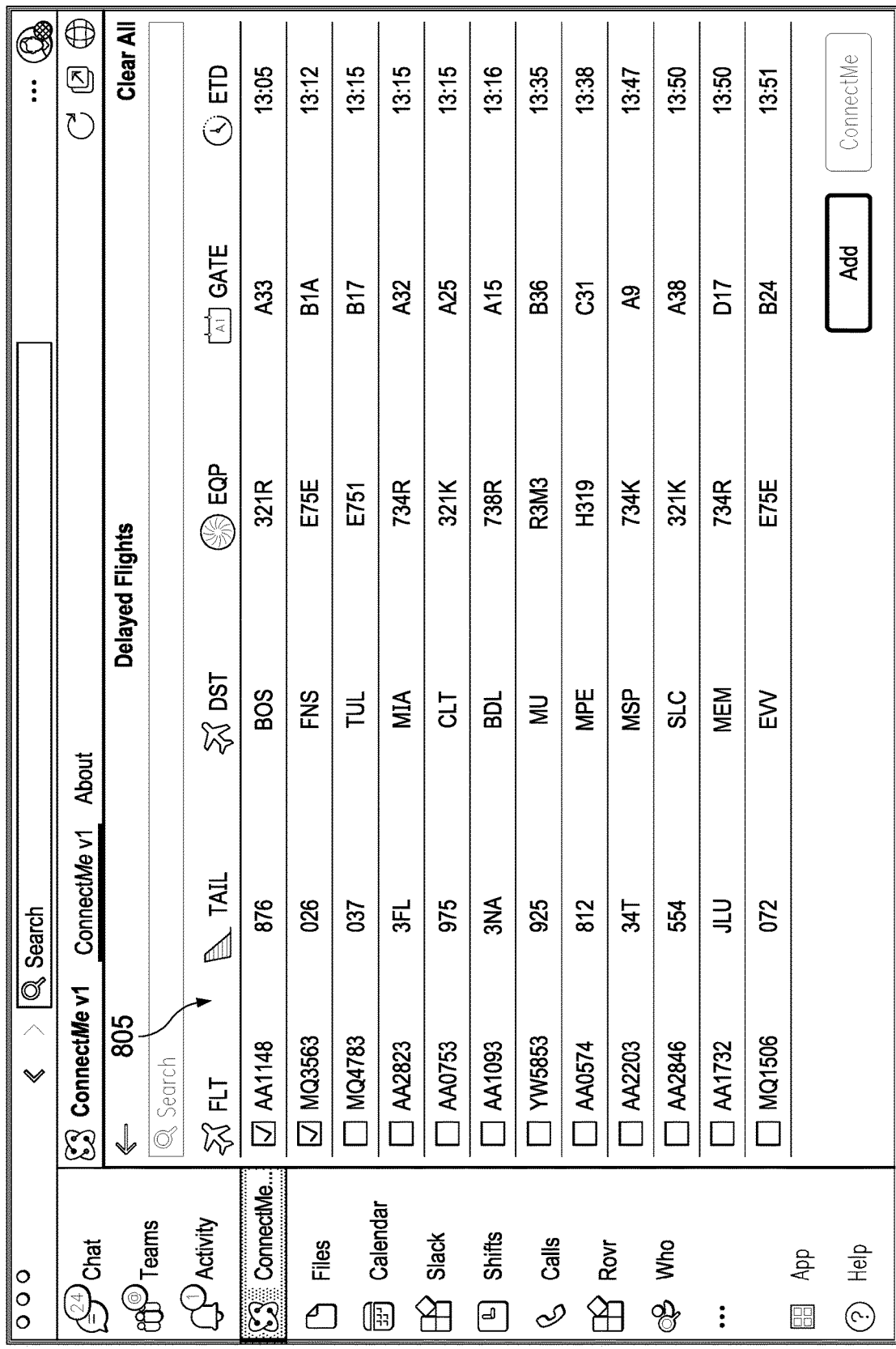
FIG. 8 is an illustration of yet another window displayed on a UI of a computer, according to an example embodiment.

An example UI is illustrated in FIG. 8 and referenced by the numeral 800. The UI includes a listing of the delayed flights 805 with each flight in the listing 805 including a flight identifier, such as flight number, a tail number, a destination, equipment identifier, gate identifier, and estimated time of departure. The departure destination is the station/airport associated with the application 210. Each flight is selectable to create or join a conversation specific to that flight, which is the common event for the conversation. For example, the flight identifier MQ3563 is selected to create or join the conversation 305 of FIG. 3.

Figure 9:
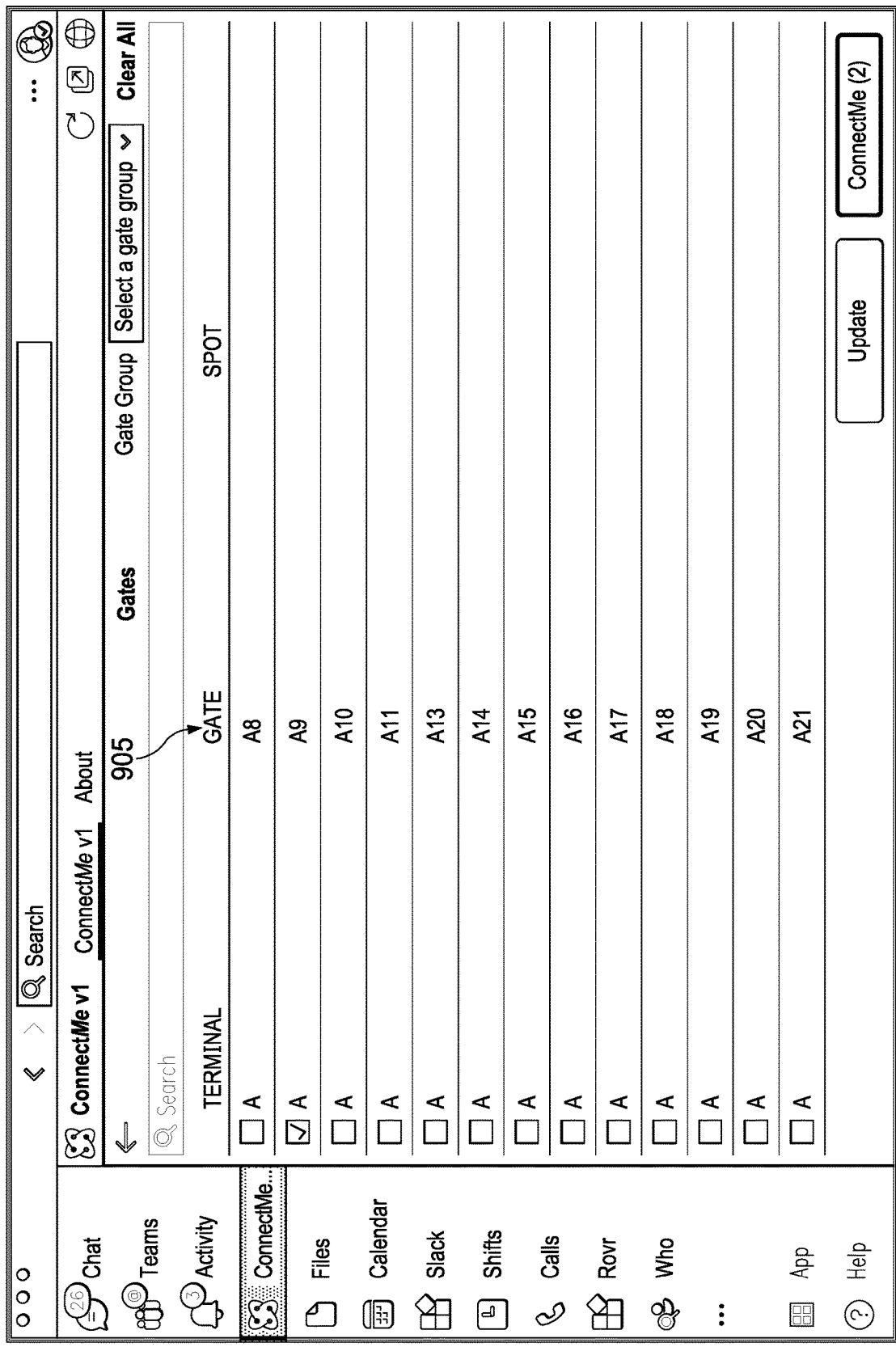
FIG. 9 is an illustration of yet another window displayed on a UI of a computer, according to an example embodiment.

An example UI is illustrated in FIG. 9 and referenced by the numeral 900. The UI includes a listing of the gates 905 with each gate in the listing 905 including a terminal in which the gate is located and the gate number. Each gate is selectable to create or join a conversation specific to that gate, with the common event for the conversation being the status and activities at the gate.

In some embodiments, the system 100 establishes context for collaboration, generally via flight and general operations. For example, the context for collaboration includes the delayed flight MQ3563 from the listing of delayed flights 805 and gate A9 from the listing of gates 905. The system 100 also provides static context (i.e., a specific airport such as the airport associated with airport/station system #1 110a; airport/station system #2 110b; and airport/station system #3 110c) for users to collaborate and share content. In some embodiments, the stations communications system 110 is further divided or grouped based on relevant topics such as inbound flight information, aircraft maintenance, weather, etc. The system 100 also accommodates dynamic context, such as flight context, via Flight Context Lifecycle Management (FCLM) Workflows based on Operations Schedule. In some embodiments, users are auto subscribed to Flight Context as per their respective work schedules. In some embodiments and regarding the generation of content, operational events that affect flights are sourced from various enterprise systems. Relevant automated notifications are shared with operations staff subscribed to flight context. As such, the system 100 includes a frontline collaboration system for automatically posting a notice to a conversation thread. In some embodiments, the system 100 is a frontline collaboration system because the system 100 allow for the communication of members that are directly involved in the preparation of an event, such as an airplane departure. In some embodiments, the system 100 provides a common communication platform for all the employees working on a flight. In some embodiments, the system 100 combines system and human generated data samples, which provide better and timely predictions regarding a flight status.

In some embodiments, the system 100 is a technical improvement over conventional technology because the system 100 combines system and human generated data samples that undergo sentiment analysis to give better and timely detect delays.

In one or more example embodiments, the system 100 or a portion thereof is stored in the computer readable medium of the computer and/or is stored in "the cloud." In some embodiments, the system 100 includes and/or executes one or more web-based programs, Intranet-based programs, and/or any combination thereof. In an example embodiment, the system 100 includes a computer program including a plurality of instructions, data, and/or any combination thereof. In an example embodiment, the application is written in, for example, Hypertext Markup Language (HTML), Cascading Style Sheets (CSS), JavaScript, Extensible Markup Language (XML), asynchronous JavaScript and XML (Ajax), iOS, XCode, Swift, and/or any combination thereof.

In several exemplary embodiments, the system 100 includes an arrangement of elements that is a technical improvement over the previous ways of communicating and updating applications. The system 100 is a technical solution to problems associated with the communication platforms and the interaction between systems. Specifically, the ability to predict a delay based on sentiment analysis of human messages that are posted to a conversation thread, automatically update other applications based on the predicted delay, and/or automatically mitigate further downstream delays based on the predicted delay is a technical improvement to conventional systems. As such, the system 100 and/or the method 500 involve an improvement to the technical field of communication applications, as well as improve the functioning of the uses' computers, as detailed above.

Figure 10:
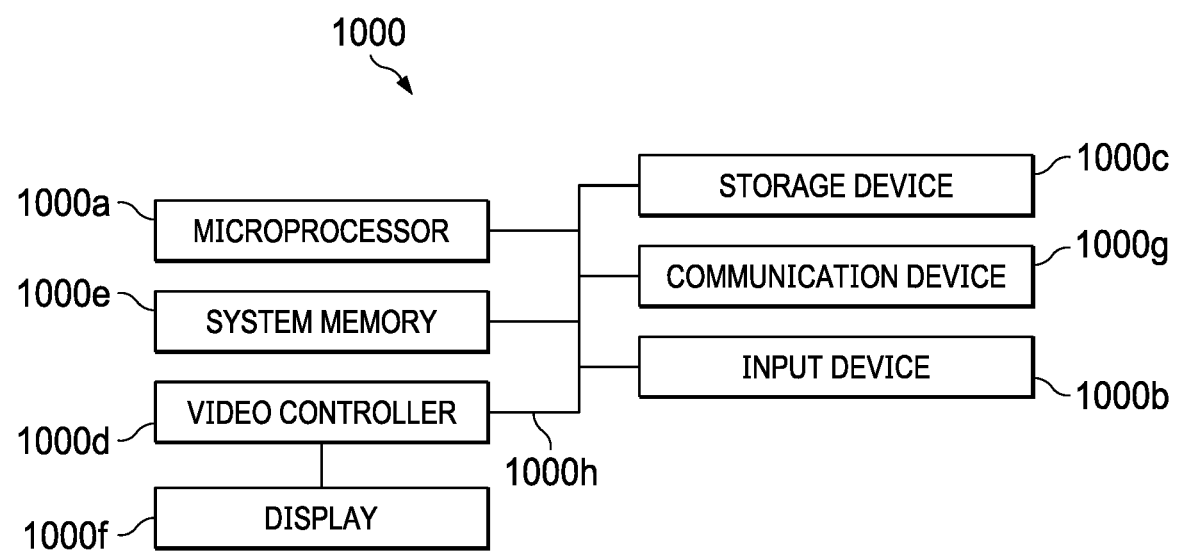
FIG. 10 is a diagrammatic illustration of a node for implementing one or more example embodiments of the present disclosure, according to an example embodiment.

In an example embodiment, as illustrated in FIG. 10 with continuing reference to FIGS. 1-4, 5A, 5B, and 6-9, an illustrative node 1000 for implementing one or more of the example embodiments described above and/or illustrated in FIGS. 1-4, 5A, 5B, and 6-9 is depicted. The node 1000 includes a microprocessor 1000a, an input device 1000b, a storage device 1000c, a video controller 1000d, a system memory 1000e, a display 1000f, and a communication device 1000g, all interconnected by one or more buses 1000h. In several example embodiments, the storage device 1000c may include a floppy drive, hard drive, CD-ROM, optical drive, any other form of storage device and/or any combination thereof. In several example embodiments, the storage device 1000c may include, and/or be capable of receiving, a floppy disk, CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1-4, 5A, 5B, and 6-9 include at least the node 1000 and/or components thereof, and/or one or more nodes that are substantially similar to the node 1000 and/or components thereof. In several example embodiments, one or more of the above-described components of the node 1000, the system 100, and/or the example embodiments described above and/or illustrated in FIGS. 1-4, 5A, 5B, and 6-9 include respective pluralities of same components.

In several example embodiments, one or more of the applications, systems, and application programs described above and/or illustrated in FIGS. 1-4, 5A, 5B, and 6-9 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as on "the cloud," for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, instructions are stored on a non-transitory computer readable medium and executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure. For example, instead of, or in addition to, transportation events often occurring in the course of airline industry business, aspects of the present disclosure are applicable and/or readily adaptable to transportation events conducted in other industries, including rail, bus, cruise and other travel or shipping industries, rental car industries, hotels and other hospitality industries, entertainment industries, and other industries.

The present disclosure introduces a method of automatically posting a notice to a conversation thread, the method comprising: generating, using a communication application, the conversation thread so that the conversation thread is displayed on a user interface to members of the conversation thread; wherein the conversation thread is associated with an event; wherein the event has an expected event timeline; and wherein the members of the conversation thread are associated with the event; posting, using the communication application, a member post from one of the members to the conversation thread; posting, using the communication application, an automated post to the conversation thread, wherein the automated post contains a message autonomously generated by a software application; performing, using a machine learning model, sentiment analysis of the member post; identifying, using the machine learning model, a predicted delay to the expected event timeline, wherein the identification of the predicted delay is based on the sentiment analysis and the message autonomously generated by the software application; sending, to the communication application and from the machine learning model, a notice regarding the predicted delay; receiving, by the communication application, the notice regarding the predicted delay; and automatically posting, using the communication application and in response to the receipt of the notice by the communication application, the notice regarding the predicted delay to the conversation thread. In one embodiment, the method also includes notifying, by the machine learning model, a down-line system of the predicted delay. In one embodiment, the down-line system comprises one or more of an external vendor, a baggage tracking application, and an airport specific application. In one embodiment, the method also includes: identifying, using the machine learning model and in response to the identification of the predicted delay, a recommended work assignment; sending, to a work assignment application and from the machine learning model, the recommended work assignment; assigning, using the work assignment application, the recommended work assignment; and sending, from the work assignment application to the machine learning model, notice of the assignment of the recommended work assignment. In one embodiment, the method also includes identifying, using the machine learning model and based on the assignment of the recommend work assignment, a predicted delay to a down-line event. In one embodiment, the method also includes revising, using the machine learning model and based on the assignment of the recommend work assignment, the predicted delay to the expected event timeline. In one embodiment, each of the member post and the automated post comprises a timestamp, a message body, and a sender identification. In one embodiment, the identification of the predicted delay is further based on the timestamp and the sender. In one embodiment, the method also includes identifying, based on any one or more of weather data, staffing dating, and fueling data, a potential delay to the expected event timeline; and wherein the conversation thread is generated in response to the identification of the potential delay. In one embodiment, the event is an airplane departing on a flight and wherein the expected event timeline is a scheduled departure time of the flight.

The present disclosure introduces a system configured to automatically posting a notice to a conversation thread, the system comprising a non-transitory computer readable medium having stored thereon a plurality of instructions, wherein the instructions are executed with one or more processors so that the following steps are executed: generating, using a communication application, the conversation thread so that the conversation thread is displayed on a user interface to members of the conversation thread; wherein the conversation thread is associated with an event; wherein the event has an expected event timeline; and wherein the members of the conversation thread are associated with the event; posting, using the communication application, a member post from one of the members to the conversation thread; posting, using the communication application, an automated post to the conversation thread, wherein the automated post contains a message autonomously generated by a software application; performing, using a machine learning model, sentiment analysis of the member post; identifying, using the machine learning model, a predicted delay to the expected event timeline, wherein the identification of the predicted delay is based on the sentiment analysis and the message autonomously generated by the software application; sending, to the communication application and from the machine learning model, a notice regarding the predicted delay; receiving, by the communication application, the notice regarding the predicted delay; and automatically posting, using the communication application and in response to the receipt of the notice by the communication application, the notice regarding the predicted delay to the conversation thread. In one embodiment, the instructions are executed with the one or more processors so that the following step is also executed: notifying, by the machine learning model, a down-line system of the predicted delay. In one embodiment, the down-line system comprises one or more of an external vendor, a baggage tracking application, and an airport specific application. In one embodiment, the instructions are executed with the one or more processors so that the following steps are also executed: identifying, using the machine learning model and in response to the identification of the predicted delay, a recommended work assignment; sending, to a work assignment application and from the machine learning model, the recommended work assignment; assigning, using the work assignment application, the recommended work assignment; and sending, from the work assignment application to the machine learning model, notice of the assignment of the recommended work assignment. In one embodiment, the instructions are executed with the one or more processors so that the following step is also executed: identifying, using the machine learning model and based on the assignment of the recommend work assignment, a predicted delay to a down-line event. In one embodiment, the instructions are executed with the one or more processors so that the following step is also executed: revising, using the machine learning model and based on the assignment of the recommend work assignment, the predicted delay to the expected event timeline. In one embodiment, each of the member post and the automated post comprises a timestamp, a message body, and a sender identification. In one embodiment, the identification of the predicted delay is further based on the timestamp and the sender. In one embodiment, the instructions are executed with the one or more processors so that the following step is also executed: identifying, based on any one or more of weather data, staffing dating, and fueling data, a potential delay to the expected event timeline; and wherein the conversation thread is generated in response to the identification of the potential delay. In one embodiment, the event is an airplane departing on a flight and wherein the expected event timeline is a scheduled departure time of the flight.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method, comprising:
    generating, using a communication application, a conversation thread so that the conversation thread is displayed on a user interface to members of the conversation thread;
        wherein the conversation thread is associated with an event;
        wherein the event has an expected event timeline;
        wherein the event comprises a subevent;
        wherein the expected event timeline is dependent upon completion of the subevent; and
        wherein the members of the conversation thread are associated with the event;
    posting, using the communication application, a member post from one of the members to the conversation thread;
        wherein the member post comprises a first timestamp and a first message body; and
        wherein the first message body comprises an indication of time associated with the completion of the subevent;
    posting, using the communication application, an automated post to the conversation thread, wherein the automated post contains a message autonomously generated by a software application;
    performing, using a machine learning model that performs sentiment analysis of member posts, sentiment analysis of the member post;

wherein performing, using the machine learning model that performs sentiment analysis of member posts, sentiment analysis of the member post comprises the machine learning model identifying, based on the indication of time, a completion time of the subevent;

identifying, using the machine learning model, a predicted delay to the expected event timeline, wherein the identification of the predicted delay is based on the sentiment analysis and the message autonomously generated by the software application;

sending, to the communication application and from the machine learning model, a notice regarding the predicted delay;

receiving, by the communication application, the notice regarding the predicted delay; and automatically posting, using the communication application and in response to the receipt of the notice by the communication application, the notice regarding the predicted delay to the conversation thread.

2. The method of claim 1, further comprising notifying a down-line system of the predicted delay, wherein the down-line system is notified by the machine learning model.

3. The method of claim 2, wherein the down-line system comprises one or more of an external vendor, a baggage tracking application, and an airport specific application.

4. The method of claim 1, further comprising:
identifying, using the machine learning model and in response to the identification of the predicted delay, a recommended work assignment;
sending, to a work assignment application and from the machine learning model, the recommended work assignment;
assigning, using the work assignment application, the recommended work assignment; and
sending, from the work assignment application to the machine learning model, notice of the assignment of the recommended work assignment.

5. The method of claim 4, further comprising identifying, using the machine learning model and based on the assignment of the recommend work assignment, a predicted delay to a down-line event.

6. The method of claim 4, further comprising revising, using the machine learning model and based on the assignment of the recommend work assignment, the predicted delay to the expected event timeline.

7. The method of claim 1, wherein the automated post comprises a second timestamp, a second message body, and a sender identification.

8. The method of claim 7, wherein the identification of the predicted delay is further based on the second timestamp and the sender identification.

9. The method of claim 1, further comprising identifying, based on any one or more of weather data, staffing dating, and fueling data, a potential delay to the expected event timeline; and
wherein the conversation thread is generated in response to the identification of the potential delay.

10. The method of claim 1, wherein the event is an airplane departing on a flight and wherein the expected event timeline is a scheduled departure time of the flight.

11. A system comprising a non-transitory computer readable medium having stored thereon a plurality of instructions, wherein the instructions are executed with one or more processors so that the following steps are executed:

generating, using a communication application, a conversation thread so that the conversation thread is displayed on a user interface to members of the conversation thread;
wherein the conversation thread is associated with an event;
wherein the event has an expected event timeline;
wherein the event comprises a subevent;
wherein the expected event timeline is dependent upon completion of the subevent; and
wherein the members of the conversation thread are associated with the event;

posting, using the communication application, a member post from one of the members to the conversation thread;
wherein the member post comprises a first timestamp and a first message body; and
wherein the first message body comprises an indication of time associated with the completion of the subevent;

posting, using the communication application, an automated post to the conversation thread, wherein the automated post contains a message autonomously generated by a software application;

performing, using a machine learning model that performs sentiment analysis of member posts, sentiment analysis of the member post;
wherein performing, using the machine learning model that performs sentiment analysis of member posts, sentiment analysis of the member post comprises the machine learning model identifying, based on the indication of time, a completion time of the subevent;

identifying, using the machine learning model, a predicted delay to the expected event timeline, wherein the identification of the predicted delay is based on the sentiment analysis and the message autonomously generated by the software application;

sending, to the communication application and from the machine learning model, a notice regarding the predicted delay;

receiving, by the communication application, the notice regarding the predicted delay; and automatically posting, using the communication application and in response to the receipt of the notice by the communication application, the notice regarding the predicted delay to the conversation thread.

12. The system of claim 11, wherein the instructions are executed with the one or more processors so that the following step is also executed: notifying a down-line system of the predicted delay, wherein the down-line system is notified by the machine learning model.

13. The system of claim 12, wherein the down-line system comprises one or more of an external vendor, a baggage tracking application, and an airport specific application.

14. The system of claim 11, wherein the instructions are executed with the one or more processors so that the following steps are also executed:
identifying, using the machine learning model and in response to the identification of the predicted delay, a recommended work assignment;
sending, to a work assignment application and from the machine learning model, the recommended work assignment;
assigning, using the work assignment application, the recommended work assignment; and sending, from the work assignment application to the machine learning model, notice of the assignment of the recommended work assignment.

15. The system of claim 14, wherein the instructions are executed with the one or more processors so that the following step is also executed: identifying, using the machine learning model and based on the assignment of the recommend work assignment, a predicted delay to a downline event.

16. The system of claim 14, wherein the instructions are executed with the one or more processors so that the following step is also executed: revising, using the machine learning model and based on the assignment of the recommend work assignment, the predicted delay to the expected event timeline.

17. The system of claim 11, wherein the automated post comprises a second timestamp, a second message body, and a sender identification.

18. The system of claim 17, wherein the identification of the predicted delay is further based on the second timestamp and the sender identification.

19. The system of claim 11, wherein the instructions are executed with the one or more processors so that the following step is also executed: identifying, based on any one or more of weather data, staffing dating, and fueling data, a potential delay to the expected event timeline; and
wherein the conversation thread is generated in response to the identification of the potential delay.

20. The system of claim 11, wherein the event is an airplane departing on a flight and wherein the expected event timeline is a scheduled departure time of the flight.

21. The method of claim 1, wherein the completion time of the subevent is different from the first timestamp.

22. The system of claim 11, wherein the completion time of the subevent is different from the first timestamp.

\* \* \* \* \*